Dec. 17, 1929.   J. H. COWAN   1,740,335
FISHING BAIT
Filed May 2, 1927
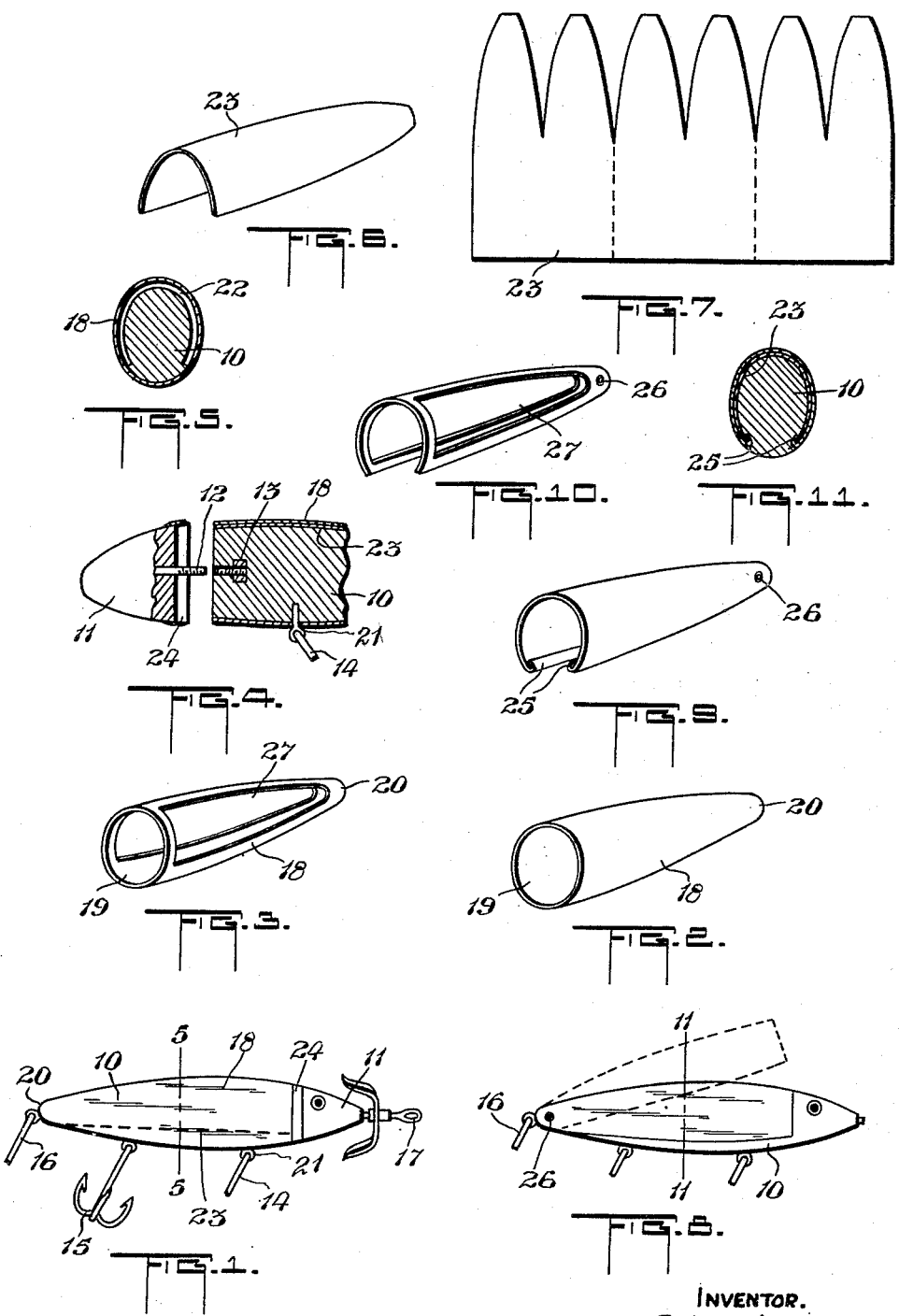
INVENTOR.
JOHN H. COWAN.
BY Featherstonhaugh & Co.
ATT'YS.

Patented Dec. 17, 1929

1,740,335

UNITED STATES PATENT OFFICE.

JOHN HAMILTON COWAN, OF OTTAWA, ONTARIO, CANADA

FISHING BAIT

Application filed May 2, 1927. Serial No. 188,365.

This invention relates to improvements in fishing baits, commonly known as plugs, and adapted for casting and trolling.

The object of the invention is to provide an improved lure or artificial fish bait readily transformable to represent a series of different baits.

A further object is to provide an improved bait of this character in which a single plug only is used, thereby saving considerable space; also whereby the average angler is provided with a complete range of plugs at comparatively low cost. In short, to provide a single bait so constructed that it can be readily changed to represent baits or plugs of different appearance and species without removing the original bait from the line.

With the foregoing and other objects in view and hereinafter more fully referred to, the invention comprises a transparent cover or enveloping member, open at one end and adapted to fit over the core of a bait or plug preferably provided with a detachable head, the core of the plug being so constructed as to provide a space between it and the cover member. Into this space is adapted to fit one or more inserts of suitable material having thereon the markings of the body of a plug of a different species and whereby on it being inserted the bait is automatically transformed to represent the particular species disclosed on the insert. The detachable head provided is then screwed into position, retaining the cover and insert in place and providing an even outer surface for the plug.

Referring now to the drawings, in which like characters of reference indicate corresponding parts in each figure.

Figure 1 is a side view of my improved plug.

Figure 2 is a perspective view of the cover or enveloping member.

Figure 3 is a perspective view of a modification of the cover or enveloping member.

Figure 4 is an enlarged longitudinal fragmentary section of the plug with head detached.

Figure 5 is a section on the line 5—5 of Figure 1.

Figure 6 is a perspective view of a single flexible insert.

Figure 7 is a plan view of a plurality of foldable inserts.

Figure 8 is a side view of a plug fitted with a modified form of cover, showing the cover in raised position in dotted lines.

Figure 9 is a perspective view of the cover member seen in Figure 8.

Figure 10 is a perspective view of a modified form of cover.

Figure 11 is a section on the line 11—11 of Figure 8.

Referring now more particularly to the drawings, 10 designates the core of the bait or plug comprising a single piece of wood or any other suitable material and 11 designates the head of the plug, detached, as in Figure 4, from the core portion 10 and designed to be secured thereto by means of a threaded pin 12 engaging with the threaded member 13 in the body portion 10.

The bait is also provided, as illustrated in Figures 1 and 8, with the usual fittings in the form of suspended hooks 14, 15 and 16 with tackle-engaging members 17 in the head.

Coming now to the essential feature of my invention, the transformation of the plug from one species to another, this is accomplished by means of a casing or enveloping member 18 of transparent material, preferably celluloid, open at the front end as at 19 and closed at the opposite end as at 20. This transparent casing is designed to be fitted over the body of the plug and, as shown in Figures 1 and 4, completely envelops it.

The hook-supporting members 21, as shown in Figure 4, are attached after the casing has been fitted.

As indicated at 22 in Figure 4, the core 10 is reduced in size in an area extending around the top and sides thereof, so that when the casing 18 is fitted on the body of the plug a spaced enclosure is formed between the casing and the core of the plug to receive an insert 23 conforming to the contour of the body of the plug but not completely enveloping same. This insert is made of any suitable water-proof material, such as celluloid or linen paper, waxed or varnished, having thereon design or colour of bait of a different species, so that when the insert is changed the plug is automatically transformed into a plug or bait of another species by the insert.

These inserts can be made singly or in strips folded, as already referred to and as illustrated in Figures 6 and 7.

After the insert is in position, the head 11 is attached and, being formed with a band member 24 which extends over the end of the cover, retains the transparent cover and insert in position on the body portion and forms an even outer surface for the plug.

The construction of the transparent cover or casing may be varied as illustrated. In Figures 8 and 9 it is shown as adapted to only partially envelop the core of the plug and is formed with longitudinally extending flanged sides 25 adapted to retain the insert. It should also be noted that this type of cover almost envelops the body, which forms a grip when the cover is on the body. This modified form of the plug is also adapted to be pivotally mounted by means of a pin in the tail of the body adapted to engage with the eyelet 26. The insert in this type is changed by merely raising the cover (see dotted lines Figure 8), removing the old one and replacing it or doubling back one of the folds as seen in Figure 7.

In Figures 3 and 10 a further modification of the cover is disclosed, in which the cover is of skeleton formation in metal, such as aluminum, instead of the transparent celluloid, the sides being cut out as at 27 to expose the inserts therebeneath.

The cover shown in Figure 3 completely envelops the body, while in Figure 10 it only partially envelops the body of the plug.

The metal covers may be held securely in position by the supporting members for the hooks being screwed therethrough into the body 10 of the plug.

These skeleton metal covers are also coloured to coincide with the colouring of the back and belly of a plug.

The general principle of the cover, however, is not departed from in any way in these modifications, all being of transparent material, the skeleton forms being preferably of light metal. Each cover is adapted to fit over the core of the plug and to retain inserts between the cover and the body, the inserts representing different species of plug and the cover permitting such inserts and the design carried thereby to be visible therethrough.

From the foregoing it will be seen that I have invented an improved plug or bait that can be quickly and readily transformed into a bait of another species. This is accomplished by the combined insert and cover, the inserts being of suitable material conforming to the contour of the body and representing, in designs and colouring, plugs of a different species. It will, therefore, be seen that the operation of placing an insert beneath the transparent cover or casing automatically transforms the original plug into one of another species. Moreover, this operation can be indefinitely repeated by means of a series of foldable inserts, such as is illustrated, which will continue to provide means for changing the bait without interfering with the line connections and as often as may be required and as circumstances may warrant.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A plug comprising a core, a permanently attached casing of transparent material fitted over the core, a spaced enclosure formed between the core and the casing, an insert of suitable material designed to fit into the spaced enclosure between the core and the casing and to partially envelop the core, markings on said insert visible through the casing and whereby the appearance of the plug is changed, and means for permanently retaining the casing on the core.

2. A plug comprising a permanently attached transparent outer casing, a core conforming to the contour of the casing adapted to fit within the casing and formed with a reduced portion adapted to provide a spaced enclosure between the core and said casing, a detachable head for the core and means associated with the detachable head and the core for detachably retaining the head on the core, means on the detachable head for sealing the casing, and contained interchangeable means visible through the transparent body or casing for changing the character of the plug.

3. The invention according to claim 2 in which hooks are connected to the core by means of conventional screw eyes and openings are formed in the casing to allow the shanks of said screw eyes to pass into the core whereby said casing is rigidly retained on the core.

4. The invention according to claim 1 in which the insert is of water proof material and consists of a sheaf of transferable coloured inserts adapted to conform to the contour of the body and being visible through the transparent casing or body to change the appearance of the plug.

5. A self-contained plug of the character described including a transparent body and a core within the body and in spaced relationship thereto, a plurality of renewal elements arranged in series adapted to individually fit the core and each provided with markings representing a plug of a different species and visible through the body.

6. The combination with a fishing plug having a core and a transparent casing, of an interchangeable insert formed of a strip of flexible material printed upon in sections on both sides and foldable in sections one upon the other, adapted to be inserted in the casing whereby the species of the plug may be changed.

7. The combination with a fishing plug having a transparent casing, of an interchangeable insert formed from a strip of material printed upon on both sides in sections, said sections being foldable one upon the other, conforming to the shape of the plug and adapted to be inserted beneath the transparent casing whereby the species of the plug may be changed.

8. A fishing plug comprising a core, a casing of transparent material adapted to envelop the core, a reduced portion formed around the major part of the core adapted to form an enclosed space between the casing and the core around the major part of the core, an insert of suitable opaque material designed to fit into the space between the core and the casing and to partially envelop the core, markings on said insert, the entire outer surface of the insert being visible through the casing, and means for retaining the casing on the core.

In witness whereof I have hereunto set my hand.

JOHN HAMILTON COWAN.